(12) United States Patent
Ottavi et al.

(10) Patent No.: US 9,489,648 B2
(45) Date of Patent: Nov. 8, 2016

(54) SERVICE REQUEST EXECUTION ARCHITECTURE FOR A COMMUNICATIONS SERVICE PROVIDER

(75) Inventors: Adriano Ottavi, San Mariano (IT); Stefano Renzo Gandini, Cannes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 2743 days.

(21) Appl. No.: 11/901,665

(22) Filed: Sep. 17, 2007

(65) Prior Publication Data
US 2009/0049444 A1    Feb. 19, 2009

(30) Foreign Application Priority Data

Aug. 13, 2007 (EP) .................................... 07425529

(51) Int. Cl.
| | |
|---|---|
| *G06Q 10/00* | (2012.01) |
| *G06Q 10/06* | (2012.01) |
| *G06Q 30/02* | (2012.01) |
| *H04L 29/08* | (2006.01) |

(52) U.S. Cl.
CPC .... *G06Q 10/0631* (2013.01); *G06Q 10/06316* (2013.01); *G06Q 10/063* (2013.01); *G06Q 30/02* (2013.01); *H04L 67/16* (2013.01); *H04L 67/28* (2013.01)

(58) Field of Classification Search
CPC ........... G06Q 10/063; G06Q 10/0631; G06Q 10/06316; G06Q 10/0633
USPC .............................. 705/7.26, 7.11, 7.13, 7.12
See application file for complete search history.

(56) References Cited

U.S. PATENT DOCUMENTS

| | | | |
|---|---|---|---|
| 2004/0117803 A1* | 6/2004 | Srivastava et al. ........... | 719/318 |
| 2005/0022163 A1* | 1/2005 | Brendle et al. ............... | 717/116 |
| 2008/0216052 A1* | 9/2008 | Hejlsberg et al. ............ | 717/114 |

OTHER PUBLICATIONS

European Search Report dated Feb. 1, 2008 for corresponding EPO Application No. 07 42 5529.
Papazoglou et al., "Service Oriented Architectures: Approaches, Technologies and Research Issues," The VLDB Journal: The International Journal on Very Large Data Bases, Springer-Verlag, BE, vol. 16, No. 3, Mar. 3, 2007, pp. 389-415.
Hutchison, B. et al., "SOA programming model for implementing Web services, Part 4: An introduction to the IBM Enterprise Service Bus," Internet citation, http://www-128.ibm.com/developerworks/webservices/library/ws-soa-progmodel4/, Jul. 26, 2005, 10 pages.
Ibarra, F., "The Enterprise Service Bus: Building Enterprise SOA," Internet citation, http://www.dev2dev.bea.com/1pt/a/389, Nov. 16, 2005.

* cited by examiner

*Primary Examiner* — William Brockington, III
(74) *Attorney, Agent, or Firm* — Brinks Gilson & Lione (57) ABSTRACT

A service request execution architecture promotes acceptance and use of self-service provisioning by consumers, leading to increased revenue and cost savings for the service provider as consumers order additional services. The architecture greatly reduces the technical burden of managing exceptions that occur while processing requests for services. The architecture accelerates the process of fulfilling requests for services by efficiently and effectively reducing the system resources needed to process exceptions by eliminating redundant exceptions corresponding to related service requests.

21 Claims, 9 Drawing Sheets

SERVICE REQUEST EXECUTION ARCHITECTURE FOR A COMMUNICATIONS SERVICE PROVIDER

PRIORITY CLAIM

This application claims the benefit of EPO Application No. 07 425 529.0, filed Aug. 13, 2007, which is incorporated herein by reference in its entirety.

BACKGROUND OF THE INVENTION

1. Technical Field

This disclosure concerns identifying and managing service requests. In particular, this disclosure concerns handling service requests and their related exceptions in a service provider architecture.

2. Background Information

The communications industry continues to face demands for more services, and rapid deployment of new services, while the complexity of the underlying technologies providing the services continues to increase. Service providers require systems that provide both residential and commercial consumers the ability to easily activate and manage requests for services directly and at lower prices. Communications service providers recognize the ability of consumers to choose desired services and take at least basic steps to order the services as a critical market differentiator. Consumers assess service providers based on the number of available services and the ease of activation and use of the services by consumers. Consumers also recognize the cycle-time between initiating a request for a service and service activation as a dominant market differentiator.

Provisioning communication services involves many complex and technical details, and often results in exceptions occurring during the process of obtaining customer information and provisioning services. Unfortunately, the lack of ready-to-use services available from business support systems (BSS) capable of supporting standard processes of communication providers creates technical challenges for service providers. The complexity of new operational support systems (OSS) deployed in support of new network services also creates technical challenges for service providers desiring to hide the complexity from consumers. The continuous desire of providers to differentiate their services from each other drives OSS to introduce more sophisticated services and complex technologies, in addition to life-cycle maintenance issues. The many technical challenges facing service providers include not only improving the experience of consumers in the context of activating and using services, but actually carrying through with a service request and successfully activating the service. Communication service providers use complex systems to track and resolve exceptions arising during the provisioning and operation of services. Current self-provisioning systems currently overwhelm and confuse consumers, discourage consumers from self-provisioning communications services, and the use of such self-provisioning capabilities. Communication service providers currently direct scarce resources to assisting consumers to provision services at the expense of focusing resources on developing and delivering new services.

Communications service providers face many technical challenges to successfully activating services as well as providing consumers with an enhanced ability to self-provision network services. The technical challenges include providing robust and dynamic user interfaces, workflow solutions that provide efficient and elegant exception handling, and service request orchestration. The already immense number of process steps, and potential exceptions that may result in the course of activating and managing network services increase exponentially with the integration of each new network element or service. Unfortunately, current systems may require a consumer to respond to an unreasonable number of exceptions in the course of activating or deactivating a service, further frustrating the consumer. Furthermore, current systems may themselves become the victims of runaway error propagation (e.g., exceptions), leading to overwhelmed system resources, multitudes of partially completed provisioning service requests, and time consuming, expensive, and technically challenging exception resolution.

A need has long existed for a system and method that efficiently and effectively accelerates the self-provisioning of services by managing exceptions, exception queues, and elegantly orchestrating the processing of service requests.

SUMMARY

The service request execution architecture ("architecture") for a communications service provider decouples the complexity of provisioning communication services from the consumer experience. The architecture identifies and manages related service requests corresponding to exceptions that may occur during the course of processing service requests. The architecture efficiently manages exceptions, exception queues, and elegantly orchestrates the processing of related service requests. The architecture accelerates the process of fulfilling requests for services by managing exceptions corresponding to requested services, and locking and unlocking related services corresponding to an exception, upon the occurrence and resolution of an exception. Accordingly, the disclosed service request execution architecture promotes effectiveness of man-machine interaction, particularly promoting acceptance and use of self-service provisioning by consumers, leading to increased cost-savings on the side of the service provider. Particularly, the architecture greatly reduces the technical burden of managing exceptions that occur while processing requests for services.

The architecture may process service requests broken into a fine level of granularity that promotes the efficient implementation, reuse, and optimization of not only the service requests, but more complicated services built with the granular service requests. Examples of the granular services requests are given in more detail below. In general, the architecture may include a comprehensive set of service requests. For example, the service requests may include a customer create service request, customer modify general date service request, and service order provisioning service request. The architecture may receive service requests and identify attributes (e.g., customer code, account code, organization code, product code, and an order id) of the service requests that define correlation codes. The architecture may use the correlation codes to manage exceptions and related service requests in a coordinated fashion. The architecture may transform the service requests to obtain orchestrated service requests that include corresponding correlation codes. In one implementation, the architecture uses an XSLT (eXtensible Stylesheet language transformation) processor to obtain orchestrated service requests. The architecture uses correlation codes to group and relate multiple orchestrated service requests. The architecture may compose correlation codes using varying numbers of attributes, and the number of attributes may be based on the characteristics of the corresponding service request.

The architecture may initiate processing of a currently orchestrated service request by extracting the correlation code from the currently orchestrated service request, and determining whether the extracted correlation code matches a correlation code corresponding to an existing service request exception stored in an exception handler queue. The architecture may attempt to process the currently orchestrated service request, where the architecture determines that the exception handler queue does not include an existing service request exception with a corresponding correlation code that matches the currently orchestrated service request. The architecture may process the currently orchestrated service request, and in the event an exception does occur, stop the processing of the currently orchestrated service request and store a service request exception with a correlation code corresponding to the currently orchestrated service request in the exception queue.

In one implementation, the architecture halts process initiation of a currently orchestrated service request, where the architecture determines that an existing service request exception exists with a matching correlation code. The existing service request exception may represent an exception resulting from an attempt to process a previously orchestrated service request. The exception handler may lock the currently orchestrated service request based on the correlation code of the currently orchestrated service request matching the correlation code of the service request exception. The architecture may resolve the service request exception and unlock both the currently orchestrated service request and previously orchestrated service requests currently locked based on the correlation codes of the currently orchestrated service request and the previously orchestrated service requests matching the correlation code of the resolved service request exception.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

The architecture may uniquely define operational events (e.g., actions) that the architecture maps to business services (e.g., service requests directed to a service). The architecture may use business services to exchange information between systems involved in the delivery and management of services. In one implementation, the architecture implements a data model schema that defines entities used to create, read, update and delete service requests. Entities may represent discrete objects within the architecture used to offer consumers services and manage the delivery of services to customers. As examples, the architecture may include entities such as a billing account entity, customer entity, and organization entity. Entities may include attributes that uniquely identify service requests and define correlation codes. The architecture may use correlation codes to identify and manage related service requests in an orchestrated manner. For example, the architecture may use correlation codes to implement exception handling functionality.

Although specific components of the architecture will be described, methods, systems, and articles of manufacture consistent with the architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. An example of such a signal is a physical layer Ethernet signal bearing TCP/IP packets that include program source code or executable programs. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

Figure 1:
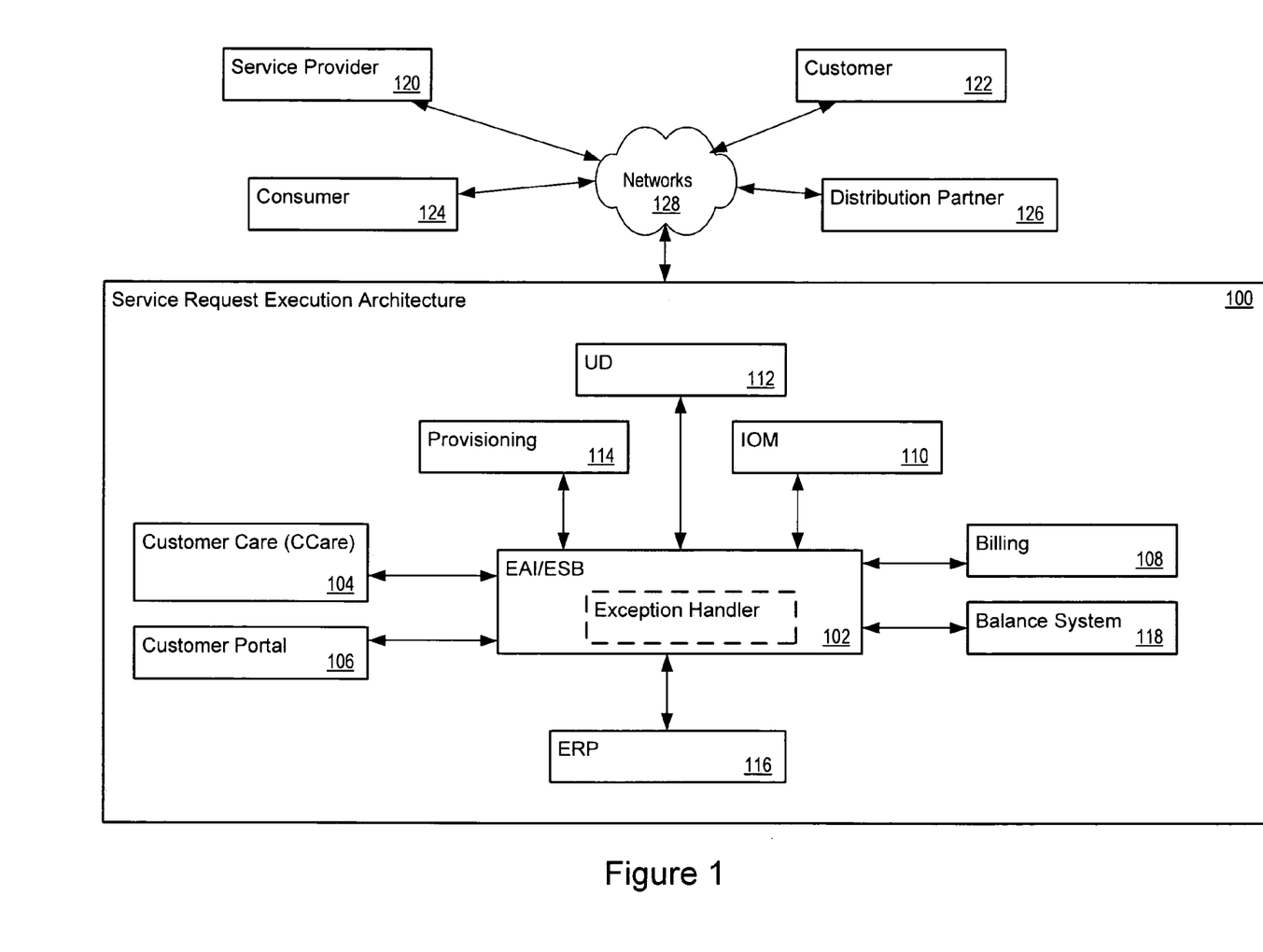
FIG. 1 illustrates the service request execution architecture ("architecture").

FIG. 1 illustrates the service request execution architecture ("architecture") 100. The architecture 100 may include an enterprise application integration and enterprise service bus (EAI/ESB) 102, a CCare (Customer Care) system 104, a customer portal 106 system, a billing system 108, an integrated order management system (IOM) 110, a unify directory (UD) system 112, a provisioning system 114, an enterprise resource planning (ERP) system 116, and a balance system 118 (e.g., account management system). The service providers 120 communicate with customers 122, consumers 124 (e.g., potential customers), distribution partners 126 and other entities through a network 128 (e.g., the Internet).

The EAI/ESB system 102 may mediate between the systems included in the architecture 100 and in communication with the architecture 100. The EAI/ESB system 102 may permit applications to execute cohesively to carry out a number of logical cross-functional business processes. The EAI/ESB system 102 may provide messaging services so that different applications can communicate together using service requests (e.g., business service requests).

Table 1 shows a list of business services the architecture 100 may use to deliver and manage provisioned services. The architecture 100 uniquely defines operational events (e.g., actions) that the architecture 100 maps to business services. The architecture 100 uses business services to exchange information such as data included in entities forwarded in service requests, between systems involved in the delivery and management of services (e.g., the EAI/ESB system 102, the CCare system 104, the customer portal 106 system, the billing system 108, IOM system 110, and UD system 112, the provisioning system 114, and the ERP system 116).

TABLE 1

Business Services

Account Invoice Inquiry
Activation
Adjustment Post-Paid Account
Bank Account Check
Create Alerts
Create Billing Account
Create Customer
Create Service Account
Create Post-Paid Order
Create Pre-Paid Order
Create Service Request
Create User
Credit Balance Inquiry
Modify Billing Account
Modify Customer Data
Modify Service Request
Modify User
Number Portability Request
Refill
Request SIM Card Replacement
Retrieve Billing Account Data
Retrieve Customer Data
Retrieve Installed Assets
Retrieve Orders
Retrieve Product Configuration
Retrieve Product List
Retrieve Product Price
Retrieve Service Accounts
Retrieve Service Request
Retrieve User Data
Send e-Mail message
Send SMS message
Service Item for Provisioning Response
Service Order for Provisioning
Service Order for Provisioning Response
Synchronize Account Billing Profile
Synchronize Account Bill to Address
Synchronize Account Bill to Person
Synchronize Account General Data
Synchronize Account Payment Data
Synchronize Account
Synchronize Asset Component
Synchronize Customer
Synchronize Customer Fiscal Address
Synchronize Customer General Data
Task Execute
Task Execute Response
Traffic Usage Inquiry
Validate Credit Card Data
Validate Customer Address
Validate Customer Data
Validate DSL availability Table 2 shows a list of objects that may represent logical entities that include attributes that further define and uniquely identify the business services. The business services may be uniquely defined by the combination of the header and one or more objects (e.g., entities). The architecture 100 may include additional, fewer or different business services and entities to deliver and manage provisioned services.

TABLE 2

Objects (e.g., Entities)

Figure 7:
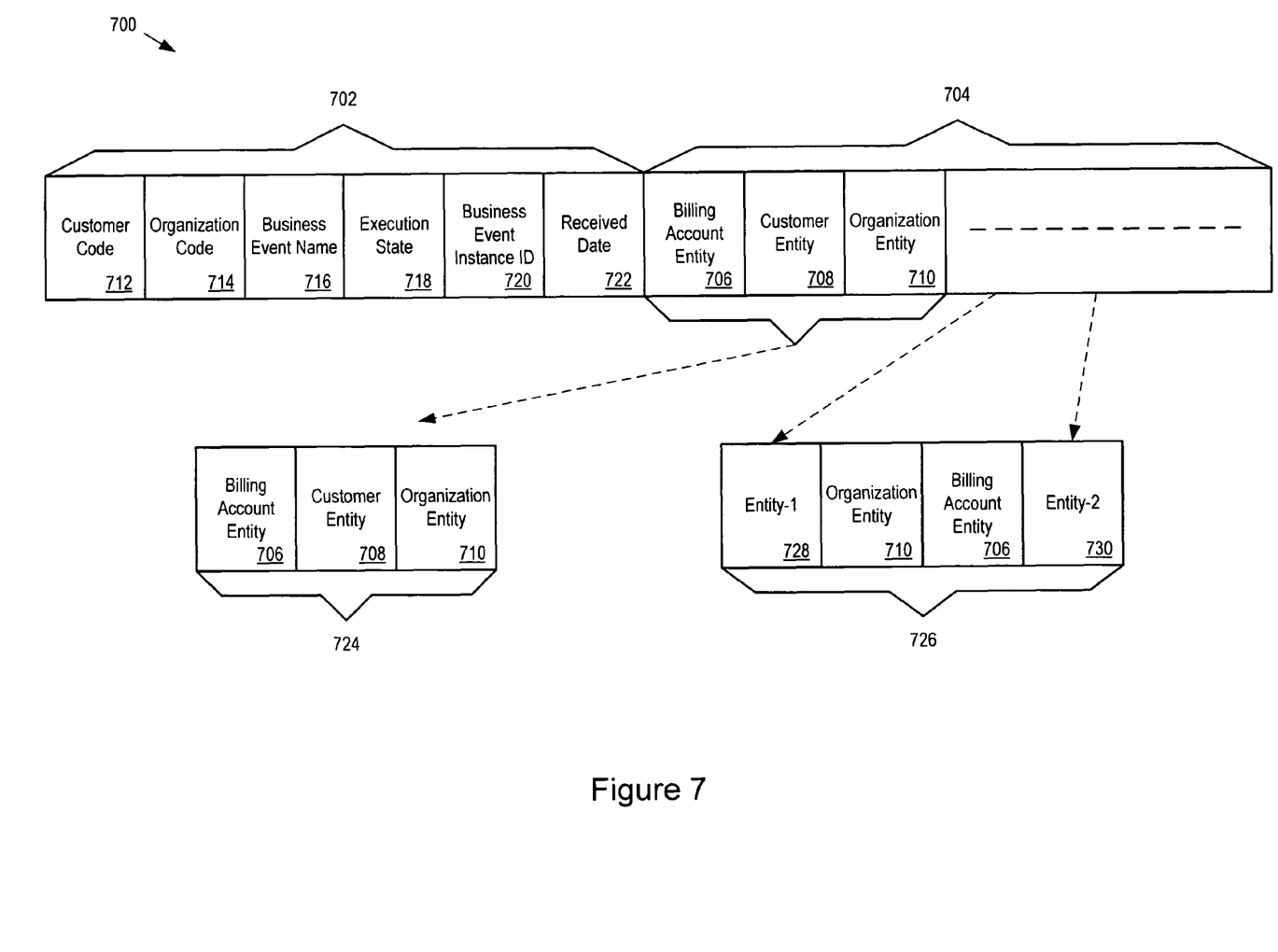
FIG. 7 illustrates the construction of correlation codes.

Address
Adjustment
Attribute
Billing Account
Billing Adjustment
Billing Profile
Contact
Customer
Invoice Data
Order
Organization
Payment Data
Product-Service
Product-Service-Account
Product-Service-Account-Address
Product-Service-Account-Contact
Product-Service-Attribute
Product-Service-User Contact
Refill
Service Order
Technical Service Order Referring briefly to FIG. 7, each business service 700 may include a header 702 and objects 704 that represent logical entities such as a billing account entity 706, a customer entity 708, and an organization entity 710. The header 702 of the business services may include attributes such as a customer code 712 to identify a customer, an organization code 714, a business event name 716, an execution state 718 to indicate status, a business event instance id 720 to identify multiple instances and threads of a business event, and a received date 722 to time stamp when a system receives a business service. The architecture 100 may consult a correlation code definition or other correlation code specification to determine which attributes the architecture 100 uses, and in what order, to form a correlation code. For example, the architecture may obtain a correlation code 724 by concatenating the ordered sequence of billing account entity 706, customer entity 708, and organization entity 710 into a single correlation code 724. In another example, the architecture 100 may obtained a correlation code 726 by combining entities from a business service 700 in a different order or sequence.

Table 3 shows example business services and entity combinations that the architecture 100 may use to deliver and manage provisioned services. For example, the create customer business service may include the header, and the entities customer, address, and organization, while the modify customer general data business service may include the header and the entities customer and organization.

TABLE 3

Business Services (Entities) Combinations

Adjustment Post-Paid Account (Billing Account, Billing Adjustment, Product-Service)
Adjustment Pre-Paid Account (Billing Account, Billing Adjustment, Product-Service)
Asset Component (Attribute(s), Product-Service)
Create Billing Account (Billing Account, Address, Organization, Billing Profile, Payment Data, Contact)
Create Customer (Customer, Address, Organization)
Refill (Billing Account, Billing Profile, Payment Data, Product-Service, Refill)

TABLE 3-continued

Business Services (Entities) Combinations

Service Order for Provisioning (Service Order, Product-Service(s),
Product-Service-Account,
Product-Service-Account-Address(es),
Product-Service-Account-Contact(s),
Product-Service-Attribute(s),
Product-Service-User-Contact(s))
Synchronize Account Bill to Address (Address, Billing Account,
Organization)
Synchronize Account Bill to Person (Billing Account, Contact,
Organization)
Synchronize Account Billing Profile (Billing Account, Billing Profile,
Organization)
Synchronize Account General Data (Billing Account, Organization)
Synchronize Account Payment Data (Billing Account, Billing Profile,
Organization, Payment Data)
Synchronize Customer General Data (Customer, Organization)
Synchronize Customer Physical Address (Address)
Task Execute (Technical Service Order, Order, Attribute(s))
Task Execute Response (Technical Service Order, Attribute(s))

The architecture 100 may use business events (e.g., business service requests) to exchange data between the systems within and in communication with architecture 100. For example, IOM system 110 may request a provisioning system 114 or UD 112 to perform a particular operation that results in a task execute event. In one implementation, EAI/ESB system 102 receives request from the IOM system 110 and forwards the request to the appropriate provisioning system 114. The task execute event may be represented by a task execute business service that contains service requests that the IOM system 110 maps to system operations tasks (e.g., create user on UD 112, and activate VOIP on a wireline provisioning system 114).

The CCare system 104 may manage customer relationships so that service providers 120 and customers 122 can access customer information directly, match customer needs with product service plans and offerings, remind customers of service requirements, and identify all the products purchased and/or in use by a customer 122. The CCare system 104 may include capabilities to help the marketing department of the service provider 120 to identify and target the best customers of the service provider 120, manage marketing campaigns with clear goals and objectives, and generate quality leads for the sales team of the service provider 120. The CCare system 104 may assist the service provider 120 to improve telesales, account, and sales management by optimizing information shared by multiple employees, and streamlining existing processes (e.g., taking orders using mobile devices). The CCare system 104 may provide the service provider 120 with functionality to form customized relationships with the customers 122, consumers 124 (e.g., potential customers) and distribution partners 126. The CCare system 104 may improve customer satisfaction, identify the most profitable customers, provide customers with the highest level of service, and consequently, maximize profits. The CCare system 104 may provide the employees of the service provider 120 with the information and processes necessary to analyze customer profiles, understand the needs of the customer 122, and effectively build relationships between the service provider 120, the customer 124 and the distribution partners 126.

The customer portal 106 provides customers 122 and consumers 124 directly accessible provisioning of service from a network (e.g., the Internet). In one implementation, the customer portal 106 represents a dealer portal and/or mobile portal for commercial and residential customers to access and provision services. In one implementation, the customer portal 106 communicates with EAI/ESB system 102 through Service Oriented Architecture Protocol (SOAP) which provides an approach to exchanging XML-based messages. The customer portal 106 provides customers 122 and consumers 124 a browser to view, purchase and provision available services, modify demographic information, billing account and payment data, view an invoice statement, balance, and refill pre-paid accounts.

The billing system 108 may perform the activity of invoicing customers 122 for products and services. The main functions of the billing system 108 may include maintaining billing data, recurrent and usage charges for services, discounts, service rates, catalogue of services, and generating printed and electronic bills.

The integrated order management (IOM) system 110 may provide the architecture 100 a foundation for process automation, as well as the human workflow components used to provision a service. The IOM system 110 design may implement service order and task level management used to successfully provision a service. The main functions of IOM system 110 may include process management, workflow, order decomposition, order re-composition, task management, status management, exception and SLA management, order and status reporting, supplement processing, cancel processing, and move, add, change and delete actions.

The unify directory (UD) system 112 may provide security and control services functionality that centralize management of customer and service related information needed by value added service (VAS) applications and a set of security features to control user access to services through the UD system 112. The UD system 112 may receive service requests from the IOM system 110 to add, modify, delete and search customers 122, users, products and services.

The provisioning system 114 may provide services to set up a service including configuring equipment, wiring, and transmission. The provisioning system 114 may manage the functionality to activate and deactivate products and services offered by a service provider 120. The provisioning system 114 may manage wireless and wireline provisioning, internet protocol television (IPTV), voice over internet protocol (VOIP), and dedicated services provisioning.

The ERP (Enterprise Resource Planning) system 116 may manage product planning, purchasing (e.g., materials and components used to deliver products and services), maintaining inventories, interacting with suppliers, providing customer service, and tracking orders. The ERP system 116 may also include application modules to manage the finance and human resources aspects of the service provider business. The ERP system 116 may manage and track the collection of the payments by customers 122 of invoices sent by the billing system 108, record the payments, and match orders and payments to distribution partners 126 (e.g., suppliers).

In one implementation, the CCare system 104 manages all the entities related to customer and account management and the orders for products and service purchased by customers 122. The CCare system 104 may initiate the operations devoted to activate, modify and remove customer data and order activation and deactivation. The EAI/ESB system 102 may replicate and forward entities as needed to the systems in communication with the architecture 100 to provision and manage services. The EAI/ESB system 102 may map the CCare system 104 event to a corresponding business service. The architecture 100 may transform data forwarded to business services into a common object model used by the systems in communication with the architecture 100 to provision and manage services. The EAI/ESB system 102 may provide logic to route events (e.g. service requests to business services) to applications using a predetermined sequence. The EAI/ESB system 102 provides consumers 124 and customers 122 with the customer portal 106 system that provides a set of invokable services. In one implementation, the customer portal 106 system forwards service requests to the EAI/ESB system 102 that the EAI/ESB forwards to CCare system 104 to provision and manage services.

Figure 2:
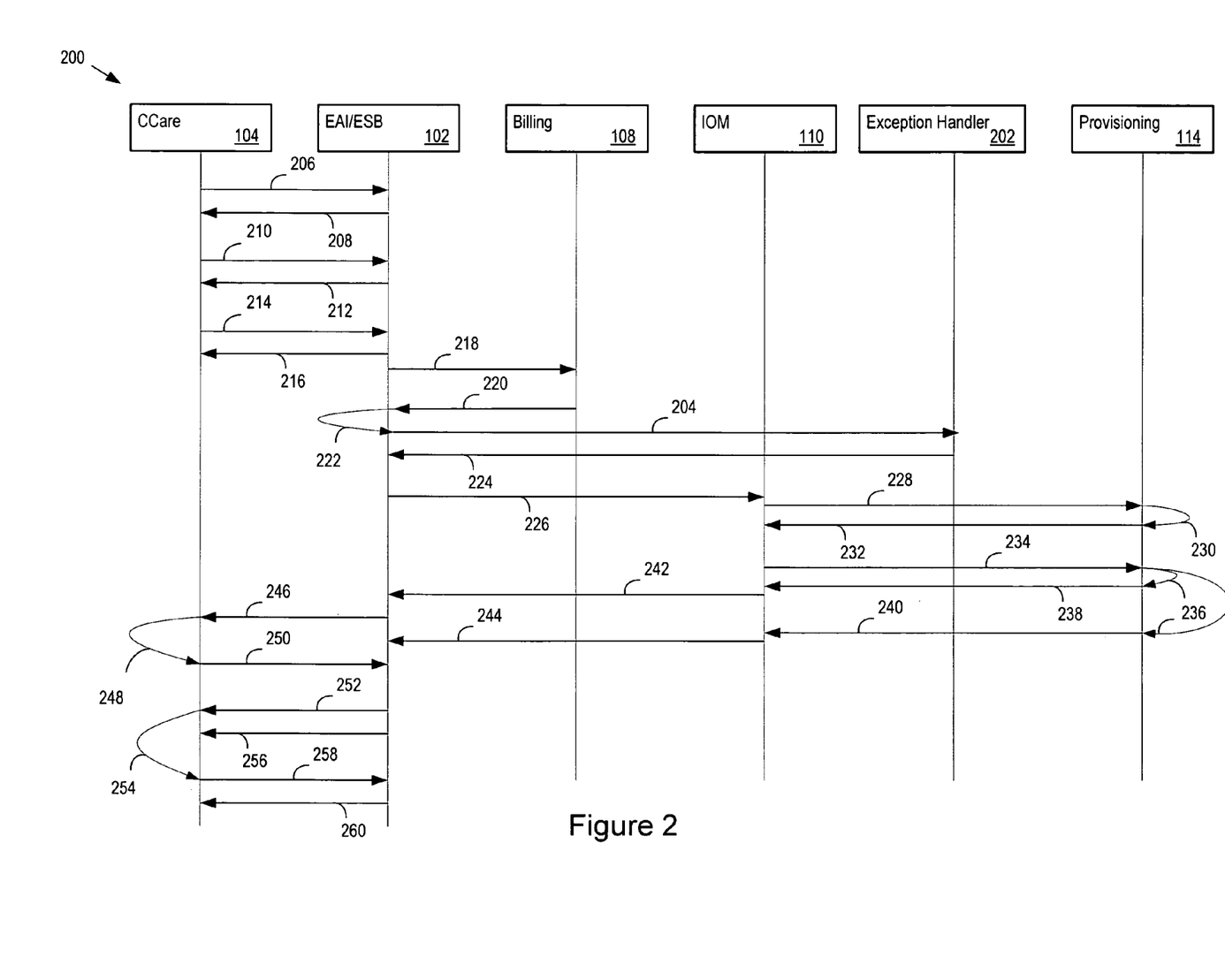
FIG. 2 shows a dataflow diagram that illustrates events that may occur to initiate the exception handler to manage an exception.

As noted above, the architecture 100 implements a sophisticated exception handling mechanism. FIG. 2 shows a dataflow diagram 200 that illustrates events that may occur to initiate the exception handler 202 to manage an exception 204. The dataflow diagram 200 illustrates a dataflow that the architecture 100 may use to manage a new order for service (e.g., create customer 206 service request) from a new customer 122. In one implementation, a consumer 124 may initiate a create customer event (e.g., create customer 206 service request) to become a customer 122 through a CCare system 104 interface. Many other data flows may be defined in the architecture 100; the dataflow diagram 200 is one example. The CCare system 104 forwards the create customer 206 service request to the EAI/ESB system 102 and the EAI/ESB system 102 returns an acknowledgement 208 to the CCare system 104 to indicate that the architecture 100 has updated entities with information corresponding to a customer, an address, and an organization representing the newly created customer 122. The CCare system 104 may initiate a create account event (e.g., create account 210 service request) corresponding to the create customer event (e.g., create customer 206 service request) for a new customer, and forward the create account 210 service request to the EAI/ESB system 102. EAI/ESB system 102 may return an acknowledgement 212 to the CCare system 104 to indicate that the architecture 100 has updated entities with information corresponding to a billing account, billing profile, payment data, and contact representing a newly created account for the customer 122. The CCare system 104 may also initiate a service order provisioning event (e.g., service order provisioning 214 service request) corresponding to the new order for service by the new customer 122 and forward the service order provisioning 214 service request to the EAI/ESB system 102. EAI/ESB system 102 may return an acknowledgement 216 to the CCare system 104 to indicate that the architecture 100 has updated entities with information corresponding to a service order, product-service(s), product-service-account, product-service-account-address (s), product-service-account-contact(s), product-service-attribute(s), product-service-user-contact(s) representing a new order for service for the customer 122.

In one implementation, the CCare system 104 forwards billing information to billing system 108 through EAI/ESB system 102. The EAI/ESB system 102 may forward information received from one system to other systems using multiple service requests. For example, the EAI/ESB system 102 may forward billing information received from the CCare system 104 to the billing system 108 in a create customer 218 service request. In one implementation, the EAI/ESB system 102 forwards the create customer 218 service request to the billing system 108 and the ERP system 116 to create a billing account. Multiple billing accounts may be created for and associated with a customer 122. The billing system 108 may map the create customer 218 service request to an event that differentiates the creation of a residential customer from a business customer based on information included in the create customer 218 service request.

In one implementation, the billing system 108 returns an acknowledgement 220 to EAI/ESB system 102 with a value equal to "NOK" 222 when a service request (SR) exception 204 occurs, where the billing system 108 attempts to process the create customer 218 service request. The EAI/ESB system 102 may forward the SR exception 204 to the exception handler 202 based on the NOK 222 value of the acknowledgement 220. The exception handler 202 may halt correlated events (e.g., modify customer related events or synchronize asset component associated to the same customer) and lock the create customer 218 service request related to the SR exception 204. In one implementation, the exception handler 202 sends the EAI/ESB system 102 a service request lock 224 to lock the create customer 218 service request.

The architecture 100 may resolve the SR exception 204 and unlock both the create customer 218 service request and forward the IOM system 110 a service order provisioning service request 226 to perform a particular service provisioning operation (e.g., create user on UD 112, and activate VOIP on the provisioning system 114). The IOM system 110 may send the provisioning system 114 and UD 112 a task execute service request 228 that initiates provisioning of services and results in provisioning information 230 being returned to IOM system 110 through a task execute response 232. The IOM system 110 may send the provisioning system 114 multiple task execute service requests 234 that result in the provision system 114 returning additional provisioning information 236 to the IOM system 110 through task execute responses (e.g., 238 and 240). The IOM system 110 may send the EAI/ESB system 102 multiple service item for provisioning responses (e.g., 242 and 244) to complete the provisioning of service for an order. The EAI/ESB system 102 may forward a service item for provisioning response 246 to the CCare system 104 and the CCare system 104 in response may return asset component information 248 to EAI/ESB system 102 using an asset component service request 250.

Figure 3:
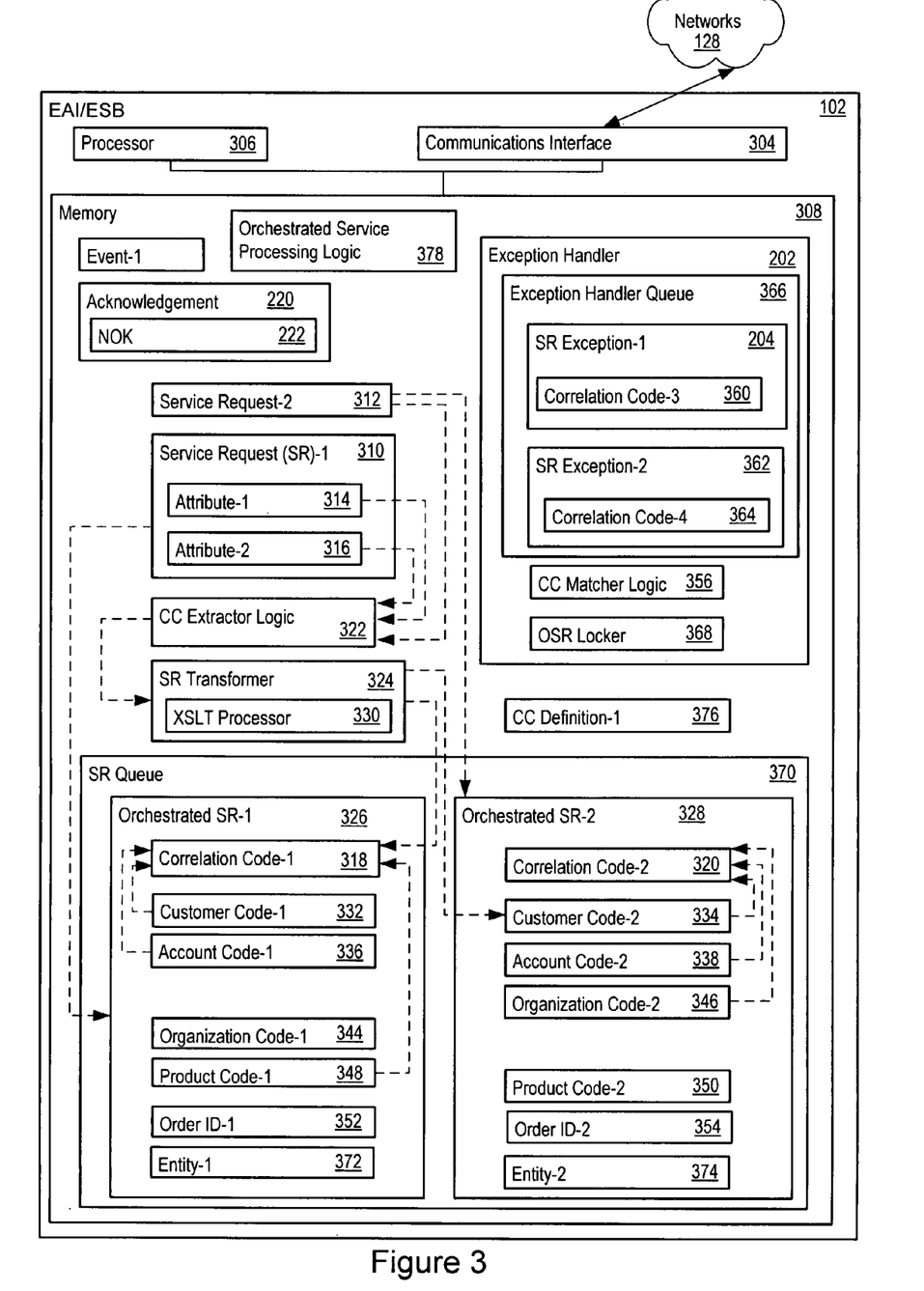
FIG. 3 illustrates the EAI/ESB system.

FIG. 3 illustrates the EAI/ESB system 102. The EAI/ESB system 102 may include a communications interface 304 used to communicate with various components of the architecture 100, a processor 306 to execute logic used to manage events and service requests, and memory 308. The EAI/ESB system 102 may receive service requests (e.g., SR-310 and SR-312) and identify attributes (e.g., attribute-1 314 and attribute-2 316) of a service request that define a correlation code (e.g., the correlation code 318 and the correlation code 320). In one implementation, the EAI/ESB system 102 employs correlation code extractor logic 322 to identify the attributes of a service request (e.g., SR-310 and SR-312) used to compose correlation codes (e.g., correlation code-1 318 and correlation code-2 320) and vary the number of attributes used to compose correlation codes based on the characteristics of corresponding service request. The extractor logic 322 may consult a correlation code definition 376 or other correlation code specification stored in the memory 308 to determine which attributes the architecture 100 uses, and in what order, to form a correlation code. The definition 376 may be pre-configured and may be dynamically changed, for example, using a user interface to the architecture 100.

The EAI/ESB system 102 may use a service request transformer 324 to transform service requests (e.g., SR-1 310 and SR-2 312) to obtain orchestrated service requests (e.g., orchestrated SR-1 326 and orchestrated SR-2 328). As an example, orchestrated SR-1 326 and orchestrated SR-2 328 may represent create customer 208 service request and service order provisioning service request 226, respectively. Orchestrated service requests (e.g., orchestrated SR-1 326 and orchestrated SR-2 328) may include correlation codes (e.g., correlation code-1 318 and correlation code-2 320). In one implementation, the architecture 100 uses an XSLT (eXtensible Stylesheet language transformation) processor 330 to obtain orchestrated service requests (e.g., orchestrated SR-1 326 and orchestrated SR-2 328). The architecture 100 may use the correlation codes (e.g., correlation code-1 318 and correlation code-2 320) to group and relate multiple orchestrated service requests (e.g., create customer 206 service request and create customer 208 service request may be represented by orchestrated SR-1 326 and orchestrated SR-2 328, respectively, with correlation code-1 318 and correlation code-2 320 matching). In one implementation, the attributes used to compose a correlation code (e.g., correlation code-1 318 and correlation code-2 320) include customer code-1 332, account code-1 336, organization code-1 344, product code-1 348, and an order id-1 352. In one implementation, the correlation codes may be obtained by concatenating the values of selected attributes into a single correlation code field, or may be obtained by application of another function on the selected attributes.

In one implementation, the architecture 100 initiates processing of a currently orchestrated service request (e.g., orchestrated SR-1 326) using orchestrated service processing logic 378 to extract the correlation code (e.g., correlation code-1 318) from the currently orchestrated service request using correlation code extractor logic 322. In one implementation, the memory 308 of the EAI/ESB system 102 includes an exception handler 202 that uses correlation code matcher logic 356 to determine whether the extracted correlation code matches a correlation code (e.g., correlation code-4 364) corresponding to an existing service request exception (e.g., SR exception-2 362). The exception handler 202 may store service request exceptions (e.g., SR exception-1 204 and SR exception-2 362) in an exception handler queue 366. The architecture 100 may attempt to process a currently orchestrated service request (e.g., orchestrated SR-1 326 and orchestrated SR-2 328), where the architecture 100 determines that the exception handler queue 366 does not include an existing service request exception with a corresponding correlation code that matches the currently orchestrated service request. For example, where correlation code-1 318 does not match correlation code-3 360 or correlation code-4 364, the architecture 100 may initiate processing of a currently orchestrated service request (e.g., orchestrated SR-1 326). However, the architecture 100 may stop the processing of a currently orchestrated service request, where a service request exception (e.g., SR exception-1 204) occurs during processing, and store the service request exception (e.g., SR exception-1 204) with a correlation code (e.g., correlation code-3 360) corresponding to the currently orchestrated service request (e.g., where correlation code-3 360 matches correlation code-1 318).

In one implementation, the exception handler 202 employs an orchestrated service request locker 368 to stop the process initiation of a currently orchestrated service request (e.g., orchestrated SR-1 326), where the correlation code matcher logic 356 determines that an existing service request exception (e.g., SR exception-2 362) has a matching correlation code (e.g., where correlation code-1 318 and correlation code-4 364 completely match or partially match according to a preconfigured matching criteria such as two of three correlation code attributes matching). The existing service request exception (e.g., SR exception-2 362) may represent an exception resulting from an attempt to process a previously orchestrated service request (e.g., orchestrated SR-2 328). The exception handler 202 may lock the currently orchestrated service request (e.g., orchestrated SR-1 326) based on the correlation code (e.g., correlation code-1 318) of the currently orchestrated service request (e.g., orchestrated SR-1 326) matching the correlation code (e.g., correlation code-4 364) of the existing service request exception (e.g., SR exception-2 362), where correlation code-4 364 and correlation code-2 320 also match because the existing service request exception (e.g., SR exception-2 362) corresponds to the previously orchestrated service request (e.g., orchestrated SR-2 328). The architecture 100 may unlock the currently orchestrated service request and previously orchestrated service request when the architecture resolves a corresponding service request exception based on the correlation codes (e.g., code-1 318 and correlation code-2 320) of the currently orchestrated service request and the previously orchestrated service request (e.g., orchestrated SR-1 326 and orchestrated SR-2 328) matching the correlation code of the resolved service request exception.

Figure 4:
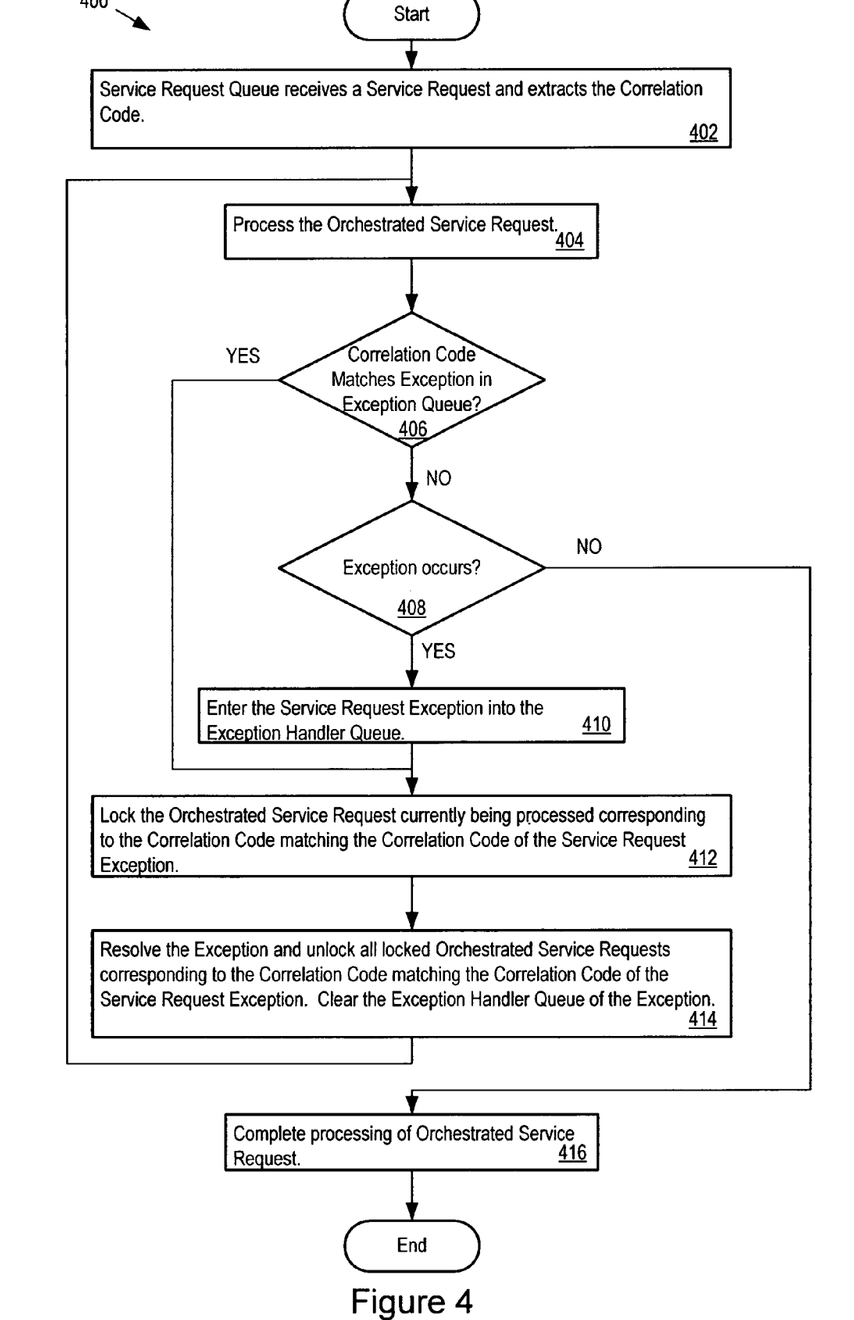
FIG. 4 shows the processing flow the architecture may take to process a service request.

FIG. 4 shows a flow diagram 400 for processing a service request. In one implementation, the service request queue 370 receives a service request (e.g., service request-1 310) and extracts the correlation code-1 318 to obtain an orchestrated SR-1 326 (402). The architecture 100 initiates processing of the orchestrated SR-1 326 (404) and determines whether the correlation code-1 318 of the orchestrated SR-1 326 matches the correlation code (e.g., correlation code-4 364) of a serviced request exception (e.g., SR exception-2 362) in the exception queue 366 (406). Where the architecture 100 determines that the correlation code-1 318 of the orchestrated SR-1 326 does not match the correlation code (e.g., correlation code-4 364) of a serviced request exception (e.g., SR exception-2 362), the architecture 100 attempts to process the orchestrated service SR-1 326 to completion unless an exception occurs (416). Where an exception occurs (408) during the processing of the orchestrated service SR-1 326, then the architecture 100 stores the service request exception (e.g., service request exception-1 204) into the exception handler queue 366 (410) and locks the orchestrated service SR-1 326 (412). The architecture 100 asynchronously continues to process other service requests while the architecture 100 resolves the exception condition. Where the architecture 100 resolves the exception condition that resulted in the service request exception (e.g., service request exception-1 204), the architecture 100 unlocks all locked orchestrated service requests (e.g., orchestrated SR-1 326 and orchestrated SR-2 328) and clears the exception handler queue 366 of the service request exception (e.g., service request exception-1 204) (414). The architecture 100 resumes processing of the orchestrated service SR-1 326 (404).

FIG. 4 further illustrates that where the architecture 100 initializes processing of an orchestrated SR-1 326 and determines that the correlation code-1 318 of the orchestrated SR-1 326 does match the correlation code (e.g., correlation code-4 364) of a serviced request exception (e.g., SR exception-2 362) in the exception queue 366, the architecture 100 locks the orchestrated service SR-1 326 (412). Where the architecture 100 resolves the exception condition that resulted in the service request exception (e.g., service request exception-1 204), the architecture 100 unlocks all locked orchestrated service requests (e.g., orchestrated SR-1

326 and orchestrated SR-2 328) corresponding to the correlation code matching the correlation code of the service request exception (e.g., SR exception-2 362) and clears the exception handler queue of the service request exception (e.g., SR exception-2 362) (414). The architecture 100 resumes processing of the orchestrated service SR-1 326 (404).

Figure 5:
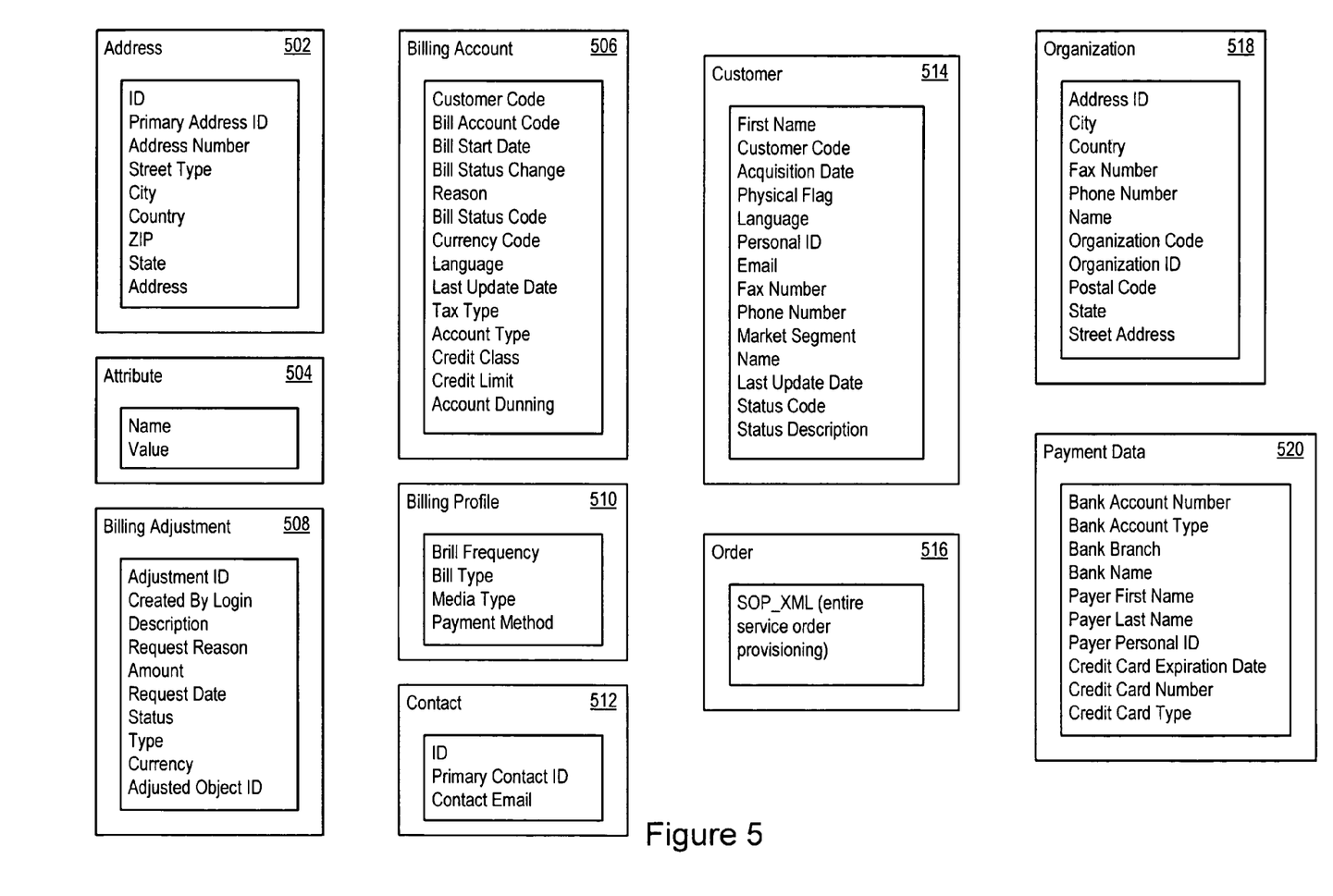
FIG. 5 shows examples of entities the architecture may use to provision and manage services.

FIG. 5 shows examples of entities the architecture 100 may use to provision and manage services. In one implementation, the architecture 100 uses a schema that includes the following entities: an address entity 502, an attribute entity 504, a billing account entity 506, a billing adjustment entity 508, a billing profile entity 510, a contact entity 512, a customer entity 514, an order entity 516, an organization entity 518, and a payment entity 520. The architecture 100 may use the entities (e.g., 502 through 520) in unique combinations to form service requests used to provision and manage services. An entity includes entity-attributes that define the entity. The number of entity-attributes included in an entity help refine the definition of and provide granularity to more efficiently manage the entity.

Figure 6:
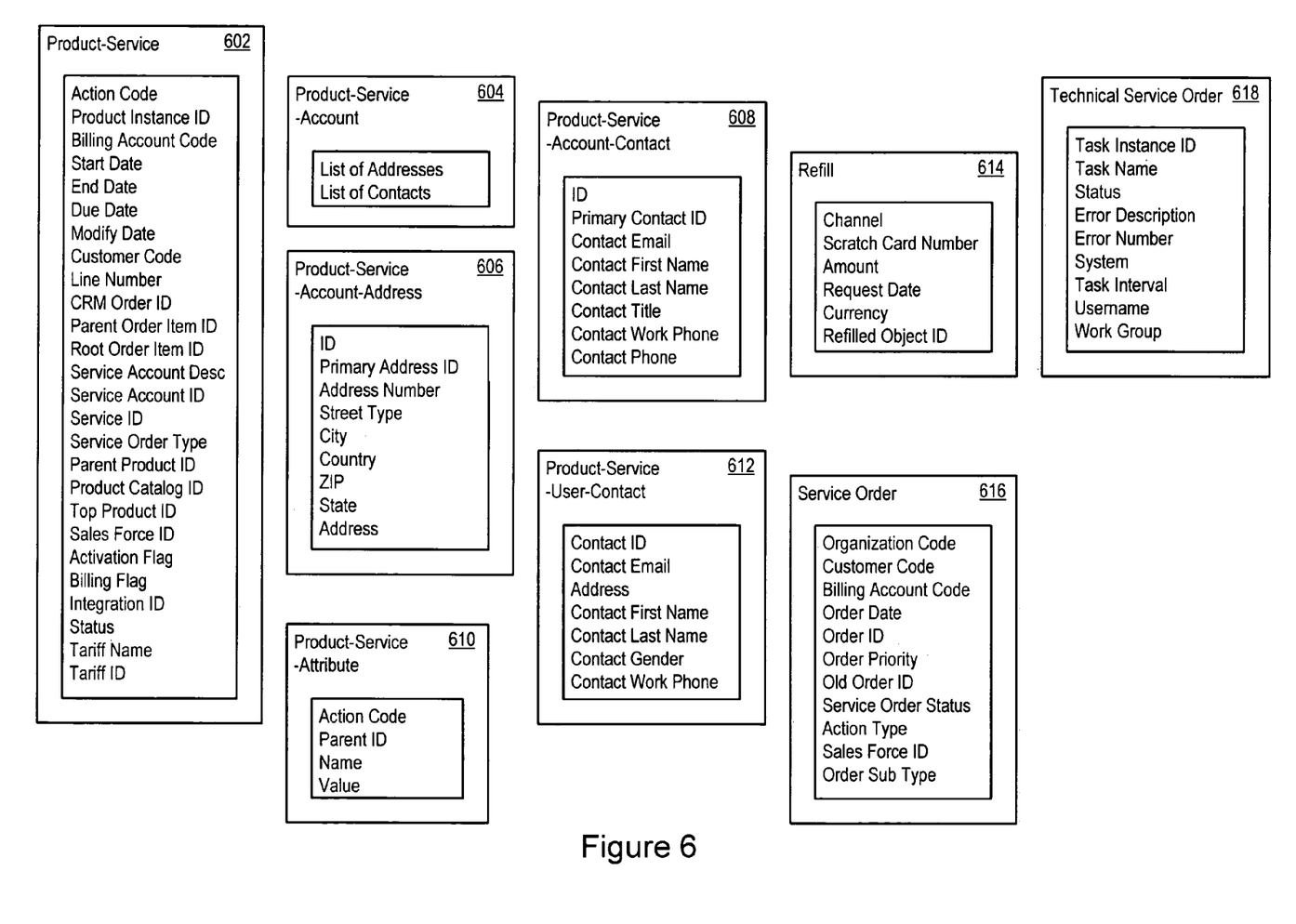
FIG. 6 shows additional examples of entities the architecture may use to provision and manage services.

FIG. 6 shows additional examples of entities the architecture 100 may use to provision and manage services. The architecture 100 may use a schema that includes the following entities: a product-service entity 602, a product-service-account entity 604, a product-service-account-address entity 606, a product-service-account-contact entity 608, a product-service-attribute entity 610, a product-service-user-contact entity 612, a refill entity 614, a service order entity 616, and a technical service order 618. The architecture 100 may use the entities (e.g., 602 through 620) in unique combinations to form service requests used to provision and manage services. In one implementation, the architecture 100 uses the entities (e.g., 502 through 520 and 602 through 618) to form service requests used to provision and manage services.

Figure 8:
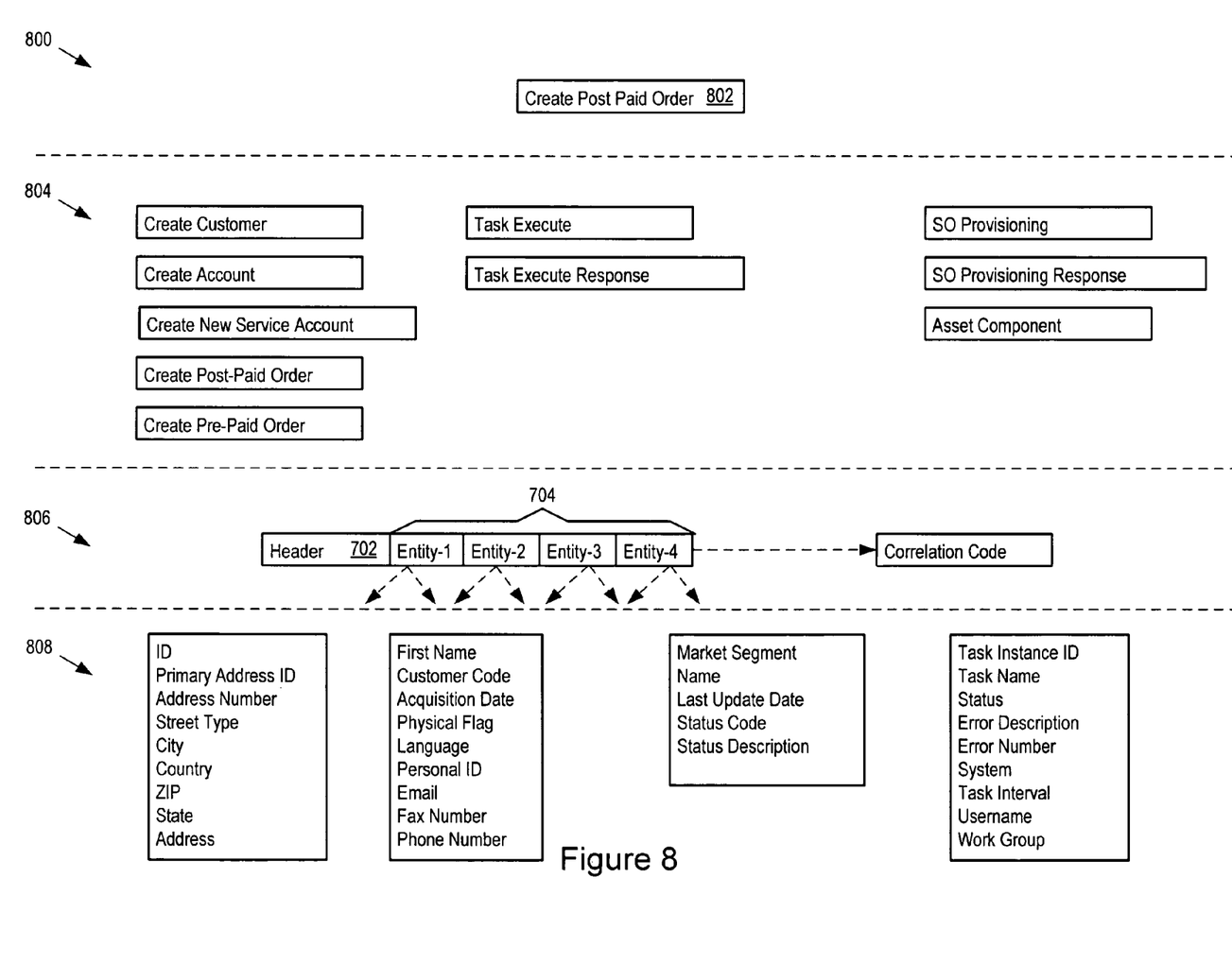
FIG. 8 shows a hierarchy of coarse grain service requests.

FIG. 8 shows a hierarchy 800 of coarse grained service requests that the architecture 100 may use to hide the complexity of provisioning and managing services. A coarse grained service request (e.g., create post-paid order service request 802) defines a progressively more granular set of component services 804 (e.g., also shown in Table 3), service request entities (e.g., entity-1, entity-2, entity-3 and entity-4 704), and entity-attributes 808 (e.g., shown in detail in FIGS. 5 and 6) used to provision and manage services. For example, create post-paid order service request 802 invokes the component services 804 that include entities 704 defined by entity-attributes 808. The architecture 100 uses layers of granularity from coarse grained service requests, component services, service request entities and entity-attributes to efficiently provision and manage services while hiding the complexity from customers 122 and consumers 124. Table 4 shows a list of coarse grained business services that may invoke component services (e.g., shown in Table 3) in combinations that may be pre-configured and dynamically changed in response to systems within and in communication with the architecture 100. Coarse grained service requests and component services may be added, deleted and modified from time to time, as systems within and in communication with the architecture 100 change.

TABLE 4

| Coarse Grained Services Requests |
| --- |
| Account Balance Inquiry |
| Account Usage Inquiry |

TABLE 4-continued

| Coarse Grained Services Requests |
| --- |
| Account Invoice Inquiry |
| Activation |
| Create Billing Account |
| Create New Customer |
| Create New Service Account |
| Create Post-Paid Order |
| Create Pre-Paid Order |
| Create Service Request |
| Modify Billing Account |
| Modify Customer Data |
| Modify Service Request |
| Retrieve Billing Account Data |
| Retrieve Customer Data |
| Retrieve Installed Assets |
| Retrieve Orders |
| Retrieve Product Configuration |
| Retrieve Product List |
| Retrieve Product Price |
| Retrieve Service Accounts |
| Retrieve Service Request |

Figure 9:
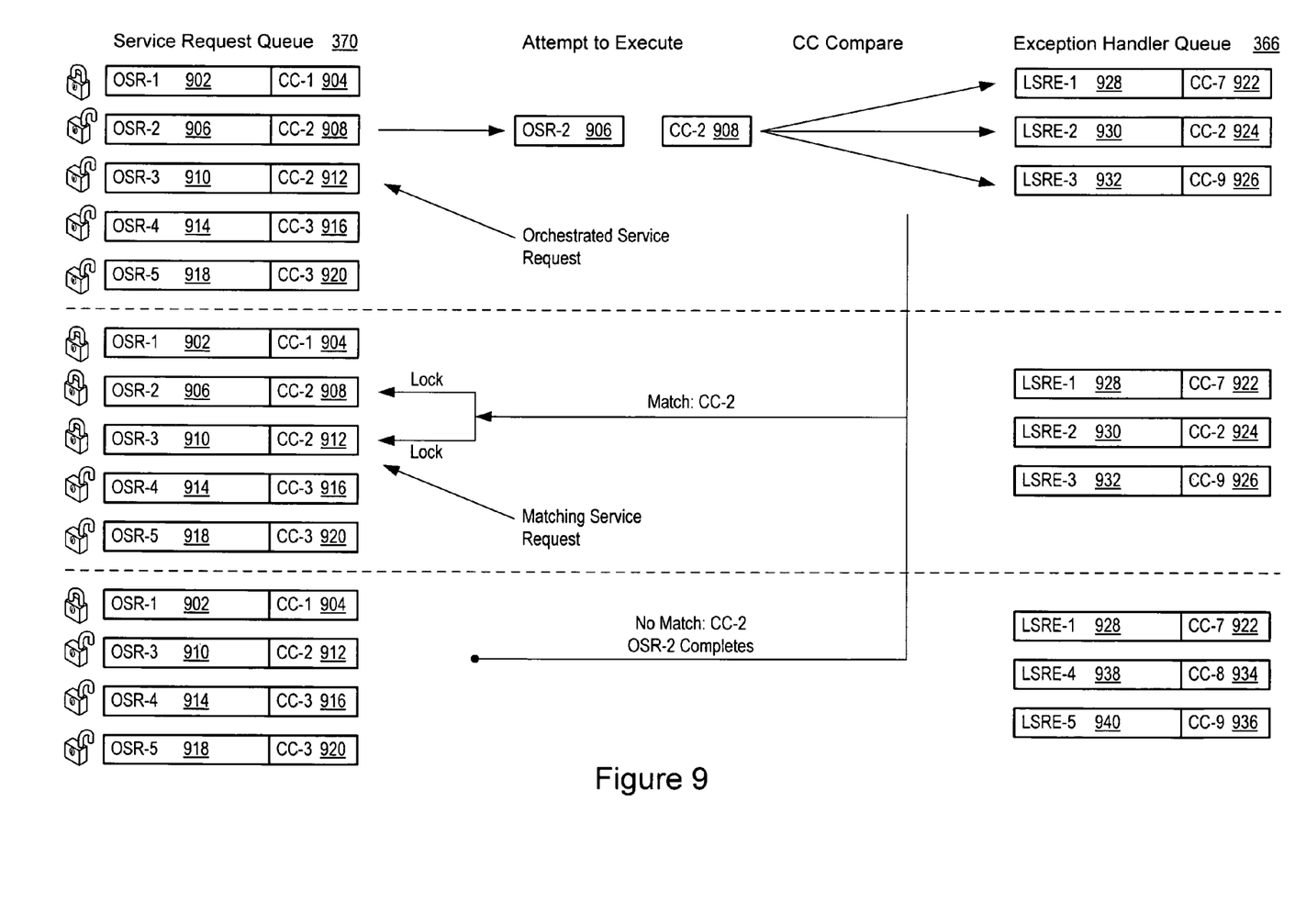
FIG. 9 shows the matching and locking processes for the architecture.

FIG. 9 shows the matching and locking processes for the architecture 100. The architecture 100 may attempt to execute an orchestrated service request (e.g., OSR-2 906) by comparing the correlation code (e.g., CC-2 908) of the orchestrated service request with the correlation codes (e.g., CC-7 922, CC-2 924, and CC-9 926) of the locked service request exceptions (e.g., LSRE-1 928, LSRE-2 930, and LSRE-3 932) stored in the exception handler queue 366. Where the correlation code (e.g., CC-2 908) of the orchestrated service request (e.g., OSR-2 906) matches the correlation code (e.g., CC-2 924) of a locked service request (e.g., LSRE-2 930) the architecture 100 locks the orchestrated service request (e.g., OSR-2 906). The architecture 100 asynchronously continues to process other service requests (e.g., OSR-4 914) while the architecture 100 resolves the exception condition. Where the architecture 100 resolves an exception condition the architecture 100 unlocks locked service requests and completes processing of the service request. Where the architecture 100 determines that the correlation code (e.g., CC-2 908) of an orchestrated service request (e.g., OSR-2 906) does not match the correlation code (e.g., CC-2 924) of a locked service request (e.g., LSRE-2 930) the architecture 100 completes processing of the orchestrated service request (e.g., OSR-2 906).

The architecture 100 solves the technical problems for communications service providers 120 of avoiding runaway errors (e.g., exceptions) and minimizing the resources required to manage exceptions by preventing redundant exceptions. The architecture 100 improves the ease of use by consumers 124, customers 122, and distribution partners 126, accelerates the self-provisioning of services, and increases self-provisioning by customers 122 of services. The architecture 100 improves the cycle-time between the initial request for service and service activation by increasing the efficiency related to managing exceptions that occur while processing service requests.

A number of implementations have been described. Nevertheless, it will be understood that various modifications may be made without departing from the spirit and scope of the invention. Accordingly, other implementations are within the scope of the following claims.

What is claimed is:

1. A method comprising:
receiving, from a sending system and through a communications interface coupled to a processor, a service request to be processed by a target system, the service request comprising service request attributes;
identifying, using instructions executable by the processor, correlation attributes in the service request attributes;
extracting, and storing in a memory using the processor, the correlation attributes and forming a correlation code from the correlation attributes;
adding the correlation code to the service request to obtain an orchestrated service request;
queuing the orchestrated service request in a service request queue;
processing the orchestrated service request, with the processor, by:
  extracting the correlation code from the orchestrated service request to obtain an extracted correlation code;
  comparing the extracted correlation code to a locked correlation code associated with a pending service request exception; and
  when the extracted correlation code and the locked correlation code match:
    searching the service request queue for matching service requests comprising the extracted correlation code in addition to the orchestrated service request;
    locking the orchestrated service request and the matching service request in the service request queue so that they do not execute and are not, therefore, communicated to the target system; and
  when the extracted correlation code does not match any locked correlation codes, communicating the service request to the target system.

2. The method of claim 1, further comprising:
resolving the pending service request exception and responsively;
unlocking the orchestrated service request; and
unlocking the matching service request.

3. The method of claim 1, where forming a correlation code comprises:
concatenating the correlation attributes.

4. The method of claim 1, where forming comprises:
varying a number of correlation attributes selected to form the correlation code based on the service request.

5. The method of claim 1, where adding comprising:
transforming the service request with an eXtensible Stylesheet language transformation (XSLT) processor to obtain the orchestrated service request.

6. The method of claim 1, further comprising:
defining multiple granular reusable service requests including any one or more of the following in any combination:
a customer create service request;
a customer modify general date service request;
a customer modify physical address service request;
a modify customer data service request;
an account modify general date service request;
an account modify billing profile service request;
an account modify bill to person service request;
an account modify bill to address service request;
an account modify payment date service request a service order provisioning service request an asset component service request;
a provisioning task service request; and
a task execute response service request.

7. The method of claim 1, where the correlation attributes comprise: a customer code, an account code, an organization code, a product code, an order identifier or any combination thereof.

8. A service request processing system comprising:
a processor couple to a memory;
correlation code extractor logic in the memory, that when executed by the processor causes the processor to:
  receive, from a sending system and through a communications interface coupled to the processor, a service request to be processed by a target system, the service request comprising service request attributes;
  identify correlation attributes in the service request attributes;
  extract the correlation attributes and form a correlation code from the correlation attributes; and
  add the correlation code to the service request to obtain an orchestrated service request;
queuing logic in the memory, that when executed by the processor causes the processor to queue the orchestrated service request in a service request queue; and
orchestrated service processing logic in the memory, that when executed by the processor causes the processor to:
  extract the correlation code from the orchestrated service request to obtain an extracted correlation code;
  compare the extracted correlation code to a locked correlation code associated with a pending service request exception; and
  when the extracted correlation code and the locked correlation code match:
  search the service request queue for matching service requests comprising the extracted correlation code in addition to the orchestrated service request;
  lock the orchestrated service request and the matching service request in the service request queue so that they do not execute and are not, therefore, communicated to the target system; and
  when the extracted correlation code does not match any locked correlation codes, communicating the service request to the target system.

9. The system of claim 8, wherein the orchestrated service processing logic is further operable to: resolve the pending service request exception and responsively; unlock the orchestrated service request; and unlock the matching service request.

10. The system of claim 8, wherein the correlation code extractor logic operable to form the correlation code from the correlation attributes is further operable to: form the correlation code by concatenating the correlation attributes.

11. The system of claim 8, wherein the correlation code extractor logic operable to form a correlation code from the correlation attributes is further operable to: vary the correlation attributes selected to form the correlation code based on the service request.

12. The system of claim 8, wherein the correlation code extractor logic operable to add the correlation code to the service request to obtain the orchestrated service request is further operable to: transform the service request with an eXtensible Stylesheet language transformation (XSLT) processor to obtain the orchestrated service request.

13. The system of claim 8, where the processor is further operable to: define multiple granular reusable service requests including any one or more of the following in any combination:
a customer create service request;
a customer modify general date service request;

a customer modify physical address service request;
a modify customer data service request;
an account modify general date service request;
an account modify billing profile service request;
an account modify bill to person service request;
an account modify bill to address service request;
an account modify payment date service request a service order provisioning service request an asset component service request; a provisioning task service request; and
a task execute response service request.

14. The system of claim 8, wherein the correlation code extractor logic operable to form the correlation code from the correlation attributes is further operable to: form the correlation code using a customer code, an account code, an organization code, a product code, an order identifier or any combination thereof.

15. A product comprising:
a non-transitory computer readable medium; and
logic stored on the medium and executable by a processor that when executed by the processor causes the processor to:
receive, from a sending system, a service request to be processed by a target system, the service request comprising service request attributes;
identify correlation attributes in the service request attributes;
extract the correlation attributes and form a correlation code from the correlation attributes;
add the correlation code to the service request to obtain an orchestrated service request;
queue the orchestrated service request in a service request queue; process the orchestrated service request by:
extracting the correlation code from the orchestrated service request to obtain an extracted correlation code;
comparing the extracted correlation code to a locked correlation code associated with a pending service request exception; and
when the extracted correlation code and the locked correlation code searching the service request queue for matching service requests comprising the extracted correlation code in addition to the orchestrated service request; and
locking the orchestrated service request and the matching service request in the service request queue so that they do not execute and are not, therefore, communicated to the target system; and
when the extracted correlation code does not match any locked correlation codes, communicating the service request to the target system.

16. The product of claim 15, wherein the logic stored on the medium operable to process the orchestrated service request is further operable to: resolve the pending service request exception and responsively; unlock the orchestrated service request; and unlock the matching service request.

17. The product of claim 15, wherein the logic stored on the medium is further operable to: form the correlation code by concatenating the correlation attributes.

18. The product of claim 15, wherein the logic stored on the medium is further operable to: vary the correlation attributes selected to form the correlation code based on the service request.

19. The product of claim 15, wherein the logic stored on the medium is further operable to: transform the service request with an eXtensible Stylesheet language transformation (XSLT) processor to obtain the orchestrated service request.

20. The product of claim 15, wherein the logic stored on the medium is further operable to:
define multiple granular reusable service requests including any one or more of the following in any combination:
a customer create service request;
a customer modify general date service request;
a customer modify physical address service request;
a modify customer data service request;
an account modify general date service request;
an account modify billing profile service request;
an account modify bill to person service request;
an account modify bill to address service request;
an account modify payment date service request a service order provisioning service request an asset component service request;
a provisioning task service request; and a task execute response service request.

21. The product of claim 15, wherein the logic stored on the medium is further operable to: form the correlation code using a customer code, an account code, an organization code, a product code, an order identifier or any combination thereof.

* * * * *